United States Patent [19]

Stiller et al.

[11] Patent Number: 5,705,139
[45] Date of Patent: Jan. 6, 1998

[54] METHOD OF PRODUCING HIGH QUALITY, HIGH PURITY, ISOTROPIC GRAPHITE FROM COAL

[76] Inventors: Alfred H. Stiller, 443 Jefferson St.;
John W. Zondlo, 252 Waitman St.;
Peter G. Stansberry, 345 Jackson Ave.,
all of Morgantown, W. Va. 26505

[21] Appl. No.: 302,481

[22] Filed: Sep. 12, 1994

Related U.S. Application Data

[63] Continuation of Ser. No. 949,985, Sep. 24, 1992, abandoned.

[51] Int. Cl.$^6$ .................................................. C10C 1/18
[52] U.S. Cl. .................................. 423/445 R; 423/448
[58] Field of Search ...................... 423/445 R, 448; 208/435

[56] References Cited

U.S. PATENT DOCUMENTS

| | | |
|---|---|---|
| 4,029,749 | 6/1977 | Murakami .................. 423/448 |
| 4,272,356 | 6/1981 | Stiller et al. ................. 208/424 |
| 4,300,994 | 11/1981 | Liotta ........................... 208/435 |
| 4,534,951 | 8/1985 | Kortovich et al. ........... 423/445 |
| 4,891,203 | 1/1990 | Singer et al. ................. 423/448 |

FOREIGN PATENT DOCUMENTS

| | | | |
|---|---|---|---|
| 1269064 | 3/1972 | United Kingdom | 423/448 |
| 1510568 | 5/1978 | United Kingdom | 423/448 |
| 2236323 | 4/1991 | United Kingdom | 208/435 |

*Primary Examiner*—Michael Lewis
*Assistant Examiner*—Stuart L. Hendrickson
*Attorney, Agent, or Firm*—William J. Daniel

[57] ABSTRACT

Ultra-clean isotropic coke is obtained from bituminous coal by extracting such coal following the extraction procedure described in U.S. Pat. No. 4,272,346, issued Jun. 9, 1981, to Stiller et al., using, for example, N-Methyl Pyrrolidone as the extraction solvent, and subjecting the extracted solids after separation of the solvent to a conventional coking heat treatment. The isotropic coke thus obtained can be ground, mixed with conventional binder pitch and shaped into carbon products which can be used directly, e.g. as carbon electrodes, or can be subjected to a graphitizing heat treatment under the usual conditions to produce isotropic graphite structures of high purity and high quality. The graphitization can be a multi-stage procedure and the porous intermediate stage products can be impregnated with a conventional impregnating pitch for increased density, the impregnating pitch being graphitized in the subsequent stage.

6 Claims, No Drawings

METHOD OF PRODUCING HIGH QUALITY, HIGH PURITY, ISOTROPIC GRAPHITE FROM COAL

This application is a continuation, of application Ser. No. 07/949,985, filed Sep. 24, 1992 now abandoned.

FIELD OF THE INVENTION

This invention relates to the production of synthetic graphite from coal rather than the usual petroleum stocks and is more particularly concerned with the production from readily available coal sources, namely, bituminous coal, of isotropic graphite of high quality and high purity suitable for high performance end uses without the necessity of subjecting the coal to a destructive heat treatment or exhaustive hydrogenation.

BACKGROUND OF THE INVENTION

The Nature and Uses of Synthetic Graphite.

Synthetic or artificial graphite, as distinguished from natural graphite mined from the earth, is an important commercial commodity having a number of end uses for which it is virtually irreplaceable. For certain purposes, it is essential that the graphite be isotropic in nature, that is, that its important physical characteristics be independent of direction and thus be substantially uniform, or at least be substantially random in nature, in all directions of measurement. In other words, such characteristics as the coefficient of thermal expansion (CTE), electrical and thermal conductivity and the like should be approximately the same irrespective of the direction in the test sample in which the characteristic in question is measured. In contrast, anisotropic graphite exhibits substantially different characteristics according to the direction of measurement, with, for example, the CTE being as much as about 20 times greater when measured in one direction than when measured in an orthogonal direction.

The striking difference in CTE between isotropic and anisotropic graphite is illustrated in the following Table 1.

TABLE 1

Coefficient of Thermal Expansion (CTE) of Graphite Samples

| Sample | Room Temperature CTE ($\times 10^{-6}$) (°C.$^{-1}$) |
|---|---|
| 1. Great Lakes (H-451 Grade) (Nuclear Graphite) — Transverse | 4.34 |
| 2. Stackpole (Nuclear Graphite) — Transverse | 4.21 |
| 3. Aremco 725 (Isotropic) (Nuclear Graphite) — Transverse | 3.87 |
| 4. Pyrolytic (Non-Nuclear Anisotropic Graphite) — Transverse | 25.8 |

One of the most important uses of graphite is as a refractory material acting as a structural enclosure for high temperature reaction or treatment vessels or zones or as a confinement for nuclear reactors employed, e. g. for the generation of electrical power. For such purposes, isotropic behavior is critical because if the graphite in a structural environment were to undergo a significantly different elongation in one direction than in a perpendicular direction as a function of temperature changes the structure would crack and collapse.

The Major Feedstocks for Graphite and Their Declining Availability.

For the past 80 years or so, graphite has been produced almost exclusively from petroleum coke. In the fractional distillation and thermal cracking of crude petroleum to produce gasoline and other products, the very high boiling fraction with a boiling point above about 900° F., remaining as a residue in the column or still after the lower boiling fractions have been removed, includes such materials as asphalt, and residuum or residual oil. Petroleum coke can be derived from this residuum by appropriate heat treatment in a separate unit. This petroleum coke responds well to the thermal treatment used in making graphite, referred to generally as "graphitization", but even when the cracking or distillation conditions are particularly selected to "promote" the formation of the coke by prolonging the residence time, known as "cracking for coke", the amount of this by-product is still quite small and not enough to comfortably meet the demand for high quality graphite.

Moreover, the internal production capacity of crude petroleum within the United States has declined rapidly in recent years and the trend is likely to become worse rather than better in future years. It is hardly in the national interest to be forced to rely heavily upon foreign sources for the raw material which serves as a presursor for a commodity of such strategic importance as graphite.

Coal tar pitch is also an important raw material used in the production of graphite articles and, in particular, is employed as a binder (binder pitch) in the creation of graphite articles from petroleum coke. This material has a unique combination of properties that adapt it as a binder in graphite-making and for other carbon products as well, namely, a melting/softening point of about 110° C. coupled with a melt viscosity permitting easy mixing with solid coke particles, a loss of only about 30–35% by wt in volatiles when subjected to pyrolysis (carbonization) with the residual carbon being well adapted for graphitization, and adequate coherence and adhesive/wetting action for the coke/carbon particles to produce structures with good mechanical properties. This pitch is physically mixed in the form of extruded pellets with a selectively-sized coke powder or flour and the mixture when heated to around 110° C., gives a viscous material which can be extruded or otherwise fashioned into desired shapes. The pitch serves as a binder to hold the coke particles together during processing and after cooling retains the shape imparted to the mixture. Upon graphitization, the binder pitch likewise undergoes graphitization.

However, coal tar pitch is a very minor by-product of the destructive distillation of coal, occurring mainly in the coking process for making metallurgical grade coke used in the steel-making industry. Thus, as the coking coal is heated in a coking oven, coal tars are driven off and when distilled yield coal pitches and feedstocks used mainly in the chemical industry. These pitches may be then further refined to remove so-called quinoline-insolubles (QI), a typical yield for the ultimate coal tar pitches being around 25–30 lbs/ton of coal. Even when the U. S. steel industry is operating at normal historical production capacity and metallurgical coke is being produced at levels to meet that capacity, binder pitch is in more acute short supply than petroleum coke. But the steel industry in the United States is presently in a serious state of decline and it appears probable that this trend will persist for the foreseeable future. Therefore, the available quantities of coal tar pitch are already insufficient just for binder purposes, much less as the major or basic raw material or feed stock for making graphite.

Even more serious is the influence of environmental considerations on coal tar pitch production. Such considerations are forcing many coke producers to adopt the so-called non-recovery coke oven technology in which all of the volatile materials given off during coking, which are deemed to be environmentally hazardous or at least undesirable, are required to be burned inside the coke oven. Since these volatile materials are the source of coal tar pitch, the result of this technology is to eliminate the production of coal tar pitch as a by-product in entirety. Indications are that future coke ovens will be required to be of the non-recovery type and, consequently, the supply of coal tar pitch in the future may well be in extreme jeopardy.

Petroleum pitch, which is viscous pitch that results when crude petroleum is cracked at a temperature of about 450°–500° C. and a pressure of 100–200 psi and the resultant heavy feedstock fraction is subjected to heat soaking at about 350° C., can also be converted into graphite but is generally utilized as an impregnant (impregnating pitch) for intermediate stage products derived initially from petroleum coke. In this case, products formed from the mixture of petroleum coke powder and coal tar pitch binder (binder pitch) after being subjected to calcination or to initial stages of graphitization are impregnated with petroleum pitch heated to reduce its viscosity to a readily flowable state to fill the pores therein resulting from the escape of volatile matter during calcination (baking) or prior stages of graphitization. Then, the impregnated products are subjected to a further baking or graphitization stage, yielding a more dense structure than would have been achieved without the impregnation. The impregnation and re-heating can be, and usually are repeated several more times until the desired ultimate density and porosity have been attained.

Petroleum pitch is less desirable as a binder pitch than coal tar pitch because it loses a considerably greater amount of volatiles during baking or graphitization but has an appreciably lower melt viscosity that gives high penetrating action into the pores of the intermediate products needed for an impregnating pitch and for this purpose, the high weight loss upon pyrolysis is tolerable since the impregnation and further heat treatment is repeated until the proper density/solidity is achieved. However, as a possible raw material for graphite or other carbon articles, it obviously suffers from the same disadvantages as petroleum coke. Both coal tar pitch and petroleum pitch are well known in the graphite industry and details as to their comparative properties can be found, for instance, in the Encyclopedia of Chemical Technology by Kirk-Othmer, Third Edition, Copyright 1978, published by John Wiley and Sons, Volume 4, ppo 573 and 574.

The Earlier Solvent Extraction Process for Coal.

In U.S. Pat. No. 4,272,356, issued Jun. 9, 1981, Stiller et al. disclosed a process for extracting coal under thermally non-destructive conditions by means of a solvent of the formula $R_n$—M(=O) (—$R^1$)—N—$R^2R^3$, where M was defined as a carbon, sulfur, or phosphorous atom, $R^2$ and $R^3$ were each a hydrogen atom or a lower alkyl groups R and $R^1$ were each a lower alkyl group, another =N—$R^2R^3$ group or $R^1$ could be another $R_n$—M(=O) (—$R^1$)—N—$R^2$—group, or together R and $R^1$ could represent the atoms necessary to close a heterocyclic ring, and n is unity where M is phosphorous and otherwise zeros typified by N-methyl pyrrolidone (NMP). The extraction conditions are mild, room temperature being suitable with mild heating possibly preferable to improve the kinetics of the extraction but in any case at a temperature below the point at which the coal undergoes softening or thermal decomposition or begins to chemically interact/react with the solvent. Pressurization was not necessary but at modest levels could aid in the penetration of the solvent into the coal matrix while high pressures were to be avoided.

The effect of this extraction was said to be the removal from the coal of the "non-fixed" carbon content, namely the tar-like materials constituted generally of solvent-extractibles and kerogens, leaving the "fixed" carbon contents described as the collection of graphite-like plate matrix structure of carbon black. Separation of the extraction solvent gave a precipitate of thick consistency said to be "somewhat equivalent to the tar products obtained in the prior art carbonization and/or gasification processes and is adapted for the same end purposes served by these conventional end products . . . ", with particular emphasis on the recovery of chemicals and intermediates. On the other hand, the residual extracted solid, after being freed of remaining solvents was said to mainly consist of "fixed carbon and ash . . . in a form which is especially advantageous for utilizations e. g. as a combustible fuel comparable to coke or in the production of synthetic fuels."

The practical application of the above extraction technique to several specific coals using NMP was described by Renganathan et al. in a paper entitled "Preparation of an Ultra-Low Ash Coal Extract Under Mild Conditions" in Fuel Processing Technology, 18 (1988), 273–278, where the extracted product was said to "represent[s] a clean-burnings high energy product for use as a fuel directly or as a feedstock for variety of coal conversion technologies."

Literature Relating to Solvent-Refined Coal (SRC) for Coking and Graphite Purposes.

The behavior in terms of change in content of quinoline insolubles (QI) and cyclohexane insolubles (CyI) of coal extracts obtained from a high rank coal with anthracene oil taking place within a simulated delayed coker preheater coil at 420° F. for one hour was examined in a paper entitled "Kinetics of Coke Formation from Coal Solutions" by Rantell and Clarke included in a Conference on Tar Pitch, Solvent Refined Coal and Petroleum as used in Carbon and Graphite Production appearing in Fuel 57 (1978), pages 130 et seq. Under such extraction condition, thermal decomposition or breakdown of the coal took place, including initial depolymerization and subsequent polymerization, and polymerization apparently increased within the preheater coil as manifested by in increase in both QI and CyI of the treated product.

In another paper at that conference "The Nature of Coking Coals" by Jasienko, various feedstocks, including extracts of coal obtained with hydrogenated anthracene oil under conditions apparently resulting in chemical disintegration of the coal, were reviewed. Such extracts, especially when derived from well coalified, i. e. coking grades of coal, were judged well suited for graphitization giving anisotropic graphite.

Discovery of the Invention.

It has now been discovered, quite surprisingly, that the extracted "non-fixed carbon content" fraction obtained from coal without the thermal disintegration of the coal by the practice of this prior extraction process is remarkably suited for use as a feedstock for the production of isotropic coke and, more especially, the production of graphite that is of isotropic character with high purity and high quality appropriate for the most demanding end uses. This was unexpected in the light of 1) the view in traditional carbon chemistry that graphite was formed from the fixed carbon content of the coal since all of the volatile matter making up the non-fixed content of the coal would be necessarily driven off during the calcination, or coking, and graphitization treatments employed in creating the graphite and its coke precursor, and 2) the experience of prior workers that the graphitization of SRC fractions produced anisotropic graphite.

OBJECT OF THE INVENTION

The object of the present invention is to produce isotropic coke and graphite from the solid extracts obtained by the non-destructive solvent treatment of coal.

SUMMARY OF THE INVENTION

An extract is obtained in solid form from a bituminous coal rated as suitable for producing coke by the steps of extracting the coal under mild, non-destructive conditions with a solvent of the class identified in U.S. Pat. No. 4,272,356, and exemplified by N-methyl pyrrolidone (NMP), separating the liquid fraction dissolved from the coal from the undissolved coal residue containing the inorganic mineral matter and other impurities of the coal by filtration, followed by evaporation of the solvent from the filtrate, leaving the solidified coal extract. This solid extract is subjected to multi-stage thermal treatment conditions effective for producing cokes namely low temperature carbonization followed by calcination, and then, if desired, to the more severe thermal conditions for producing graphite.

The low temperature carbonization is typically carried out at temperatures in the order of about 400°–600° C., and can be in two phases, the first at about 400° C. for a few hours and the second at about 600° C. for an additional hour or so, yielding what is commonly referred to as "green coke". In the calcination stage, the "green coke" is heated to about 900°–1300° C. to give "calcined coke". Both of these stages are carried out in an inert atmosphere to preclude oxidation or combustion. Where the calcined coke is, as is usually the cases to be shaped into product form or molded into precursor shapes for subsequent graphitization, it is ground into powder, mixed with a minor amount, e.g. about 30% by weight, of a so-called "binder pitch", a conventional material which is usually a coal tar pitch fraction of appropriate properties according to the intended use, and shaped, e. g. by extrusion, molding or the like, and then again subjected to carbonizing conditions. It is then ready for direct user for example, for carbon anodes for the aluminum industry, or for graphitizing, which involves the application of extremely high temperature conditions in the order of about 2800°–3500° C. for a time varying with the degree of graphitization desired in the final product.

For ultimate products of increased density and solidity and maximum mechanical properties, such as strength and durability, both the carbonization and graphitization can be performed in two or more stages, with the intermediate stage products being impregnated with a relatively low viscosity "impregnating pitch", typically derived from petroleum pitch, to penetrate and fill the pores generated by the escape of volatile components during heating. The pitch also undergoes carbonization or graphitization, as the case may be, during the subsequent heating and the impregnation step can be repeated one or more times until the desired degree of density has been achieved.

DETAILS OF THE INVENTION

The present invention resides essentially in the selection of the particular coal extract that is produced by application to bituminous coal of the extraction process of U.S. Pat. No. 4,272,356, issued Jun. 9, 1981, to Stiller et al. as the starting material for processing into coke products, both green coke and calcined coke, and preferably ultimately into graphite products, rather than in the selection of any particular combination of conditions either for effecting the extraction or for the conversion of that extract into either the coke products or graphite products. Consequently, the precise details for each of the separate steps of the overall process can vary widely; within the latitude recognized for the same either by the technical literature including patent disclosures as well as the practical execution in industry, where numerous variations have been developed to suit particular circumstances and individual company preferences.

Extraction.

As originally disclosed, the solvent extraction process of U.S. Pat. No. 4,272,346 was broadly applicable to a wide variety of coals virtually without limitation. For purposes of the present invention, it is necessary that the raw coal be of a type that is recognized as suitable for formation into coke. Thus, anthracite or hard coals are generally unsuitable at one extreme, as are soft brown coals or lignite at the other extreme. Virtually any bituminous coal is thus indicated as a suitable starting coal and those relatively high in vitrinite concentration and relatively high in mineral matter (>10%) are preferred.

The selected coal should be ground into particles of a size adapted for effective contact with the liquid solvent so as to promote efficient extraction. The particle size is not critical but generally small particles are usually preferred, e.g. passing a 30–100 mesh screen, according to the Tyler Standard Scale or U. S. Sieve Series, or even smaller, -60 mesh being a representative value.

As already indicated, the extraction solvent is a compound within the general formula $R_n$—M(=O) (—$R^1$)—N—$R^2R^3$, where M is a carbons sulfur, or phosphorous atoms $R^2$ and $R^3$ were each a hydrogen atom or a lower alkyl group, R and $R^1$ were each a lower alkyl group, another =N—$R^2R^3$ group, or together $R^1$ and $R^2$ could represent the atoms necessary to close a heterocyclic ring, or $R^1$ can be a $R_n$—M(=O) (—$R^X$)—N—$R^2$—group where R, n, $R^2$ are as befgore and $R^X$ is a lower alkyl group, another —$NR^2$ $R^3$ group or together with $R^2$ can represent the atoms to close a hyeterocyclic ring, and n is unity where M is phosphorous and otherwise zero. Such compounds are typified by N-methyl pyrrolidone (NMP) and NMP is preferred for the practical execution of the present invention. Other solvents within this general formula that could be effectively employed are specified in the description of U.S. Pat. No. 4,272,356 and reference may be had to that description which is incorporated by reference in totality into this specification. Further details as to the chemical structure of the solvents consequently, need not be repeated here and where in the ensuing discussion reference is made to NMP, it will be understood that such reference is given as an example representative of the entire class of useful solvents.

The temperature of the extraction operation is not critical other than to avoid drastic temperatures that would have a destructive action on the coal in conjunction with the selected pressure. Mild temperatures are acceptable up to about the boiling point of the selected solvent and while room temperature operation is possible, some heating is often more advantageous in promoting more rapid and complete dissolution of soluble fraction of the coal within a reasonable period of contact. Similarly, the pressure used during extraction is not critical. Ambient pressures are preferred since they avoid more complicated and expensive processing equipment but if added cost is not a compelling objective or if the imposition of some degree of pressure achieves a compensating increase in efficiency, there is no reason, in principle, why above-atmospheric pressures could not be utilized.

The coal particles should be in at least substantially dry condition for the extraction in as much as water is miscible in all proportions with at least the preferred extraction solvent NMP and impedes dissolution of the coal particles by the solvent. That is to say, the addition of water changes the solubility characteristics of the solvent, at least in the case of NMP, and destroys its solvent power for the starting coal by acting as an "anti-solvent" so that, for instance, the addition of water to a solvent solution of the extract of the invention results in rejection, i. e, precipitation, of the dissolved extract from the water-solvent mixture. If need be, and preferably, the particles are heated prior to the extraction to ensure that they are in a suitably dried condition and can even be flushed with dry nitrogen gas to preclude the presence of trace amounts of moisture.

Agitation is preferably applied during the extraction to promote vigorous solid-liquid contact and accelerate dissolution as much as possible and the solvent can be maintained under reflux conditions under a nitrogen atmosphere. The relative proportion of solvent to coal can be varied with different solvents as well as different coals but will usually fall within the ratio range by weight of about 3:1 to 10:1, the amount of solvent in any case being in excess of the coal.

The duration of the extraction can also vary with different combinations of materials and conditions but generally extends for about 5 minutes to 2 hours or so. The end point of the extraction is indicated by no further change in the concentration of the coal extract in the solvent or, alternatively, in the dry weight of the solid residue. This can readily be determined empirically by trial and error, if need be. At this stage, the mixture consists of a solution of the solvent containing all of the soluble organic matter from the coal (the extract) and a solid residue of the undissolved mineral matter and undissolved organic matter from the coal (the residue). Because coal is created randomly in nature and hence varies widely in compositions including inorganic matter (the structure of pure coal being distinctly aromatic and thus organic in nature), the percentage of the original coal dissolved by the solvent will likewise vary from as little as about 25% up to about 80% by wt but a recovery of about 40–60% by wt will be usual with NMP for reasonably good grades of coal. Exclusive of inorganic matter or ash, about 70–75% of the organic carbon content of the coal can be dissolved and recovered, all of which qualifies as quinoline soluble, any carbon black or other carbon present being insoluble in the solvent.

The insoluble matter or residue after completion of the extraction can be separated readily from the liquid extract by simple filtration using, for instance, a traditional Buchner filtration apparatus. Preferably, the entire contents of the extraction vessel after cooling under nitrogen are transferred to a centrifugal separator and subjected to centrifugation at several thousand revolutions per minute, e. g. 3000, for a few minutes, e. g. about 20 min. in order to separate out the suspended solids and facilitate the following filtration. With centrifugation, the solid residue can be retained on a 5 micron filter paper or equivalent and is preferably washed with fresh solvent to maximize the extraction.

The extract is then combined with water in the amount of about 25%–500% of the original volume of the solvent, present, for instance, in the receiving vessel of the filter unit so as to initiate a solvent inversion and thereby precipitate all of the extracted coal. The solvent-water mixture can be poured off and the solid coal extract dried as in a vacuum oven at about 150° C. until there is no further weight change. The solvent-water mixture remains as a single liquid phase and the solvent can be recovered for re-use by traditional distillation techniques.

As an alternative to solvent inversion separation, the solvent can be evaporated directly under vacuum in a rotary evaporator of suitable capacity and the solvent vapor condensed for re-use. The recovered solid after drying consists of essentially pure quinoline soluble coal extract virtually entirely free of ash and other mineral matter. In this condition, the recovered solid is uniquely suited for production of carbon products equally free of contaminants and impurities and is ready for thermal treatment necessary for the production of such products, including graphite.

Thermal Treatment.

As noted above, the thermal treatments used for this purpose are those conventionally employed and the details may be varied in accordance with industry custom and practice. The first thermal treatment is normally a coking operation which is carried out for commercial production in an air-tight coking oven or the like or for laboratory experiments in a sealed "coking tube", by way of simulating commercial conditions, so as to prevent oxidation or combustion and is ordinarily separated into several stages.

The first stage is a low-temperature carbonization where the recovered solid extract is initially heated at a rate of about 100° per hour to about 400° C. and held at this temperature for several, say 12 hours. The general understanding is that during this stage, the extract initially softens and goes through a plastic stage, which is believed to be essential to the desired end results probably undergoing some degree of depolymerization, dealkylation (elimination of alkyl side chains), dehydrogenation, and loss of volatile matter. Then, in a second phase, the oven temperature is rapidly raised to about 600° C. for a shorter period of about one hour to complete degassing of volatile matter and allow some re-polymerization or cross-linking to take place.

The product can be harvested at this point if desired and is referred to as "green coke". It has the appearance of a black mass which is fairly friable and permeated by bubble cavities or pores created by the evolution of volatile matter while in a softened or molten state.

The second stage of coking takes place at a substantially higher temperature and is known as calcination. In commercial operation, calcination can be achieved in the same oven while in the laboratory, the low temperature oven is allowed to cool enough for transfer of the coking tube to a higher temperature furnace needed for calcination. The calcination operation usually is at a temperature in the range of about 1100°–1400° C. and typically lasts a total of about one hour, including a heat-up period, a treatment period applying maximum temperature for about one-half hour and until there is no evidence of the escape of volatiles, and a cool-down period. Like the initial carbonization, calcination must, of course, be under an inert, e. g. nitrogen or argon gas, atmosphere. The product is known as "calcined coke" and has the appearance of grey-colored volcanic lava. It is now hard, having lost its initial friability, but the bubble cavities or pores remain.

Generally, the calcined coke derived from the solvent extracted solid of the invention will exhibit isotropicity in that its physical properties, notably CTE and electrical conductivity are independent of directions i. e. are generally uniform in all directions of measurement. However, it is advisable to positively confirm the existence of isotropicity, especially if the intended ultimate end use is for nuclear graphite, which can be done by observation with an optical microscope in the following manner. A sample of the calcined coke is embedded in an block of a hard resin, e. g. epoxy resin, and polished. The polished surface of the sample is examined with an optical microscope equipped with a polarized light source. If when the sample is viewed under polarized light, the molecular domains are sufficiently large to show a laminated or lamellar appearance, such appearance is evidence of anisotropicity whereas the absence of such lamella, signifying small molecular domains, is proof of an isotropic character.

The calcined coke can be utilized directly for some purposes or it can be subjected to graphitizationo In either instance, the calcined coke is ground into particles and sized to the specifications of the intended use which may combine two or more different sized fractions. The sized fraction or fractions are thoroughly mixed to insure homogeneity with coal tar pitch (binder pitch) particles for shaping or molding. The proportions of the mix depend to some extent on the intended product but the amount of the binder pitch is generally in the range of about 20–30% by wt of the total mix and usually around 30%. Heating of the mix to about 100°–110° C. melts the pitch particles, rendering the mix fluid and ready for shaping by molding, pressing, extrusion, etc. When cooled to a normally solid state, the shaped article is referred to as a "green piece". It is then baked or calcined under the same conditions described above except the calcination time may be extended to up to eight hour, in order to drive off the volatile matter of the binder pitch and cooled. In this stage, the calcined product is a precursor for graphite-making, provided it exhibits the required isotropicity which can be verified by measurements for linear coefficient of expansion made orthoganally on the green piece, or is ready for direct use.

Graphitization is achieved by extremely high temperature heating in an electric furnace to a temperature in the range of about 2800°–3500° C. for a time that can vary from a few hours up to a few months dependent upon the size of the object being treated and the degree of graphitization that is desired in the final product.

The graphite resulting from the present invention is of high quality and high purity suitable for end uses having stringent requirements or specifications, including tiles or plates for space shuttles, liners or bricks for high temperature furnaces, nuclear reactors and the like. Its content of impurities can be in the order of a few parts/ten thousand and may even be too small to be detected in the usual ways. The density graphite is 2.2 gm/cc whereas the density for needle coke derived from petroleum pitch for making anisotropic graphite is 2.1 gm/cc.

Additional information and details on techniques for coking coals can be found in Kirk-Othmer, supra, Volume 7, pp. 285–298, and for graphitizing cokes in the same sourced Volume 4, ppo 570–627 as well as in a report entitled "Graphite Electrodes" published in Industrial and Engineering Chemistry, January, 1943, Vol. 46, No. 1, pp. 2–11, all of which are incorporated by reference to illustrate the known state of the art as to such processes. The latter report is specifically concerned with the production of graphite for electrodes for which anisotropic graphite would be the preferred material but the preparative details would be equally applicable to isotropic graphite as in the present invention.

DETAILS OF ILLUSTRATIVE EMBODIMENT

Two pounds of Bakerstown coal from Preston County, W. Va., a typical commercially available high volatile-A bituminous coal having properties specified in Table 2, to follow, is ground to −200 mesh. The powdered coal is dried in an oven at 105° C. for about one day while the oven is being continuously flushed with dry nitrogen gas so that all water vapor is driven from the coal. The two pounds of dried coal is placed in a 12 liter round bottom flask which is equipped with a refluxing condensers stirrer and nitrogen flush port.

Into this flask is poured 8 liters of freshly distilled N-methyl pyrrolidine (NMP). The mixture is heated to boiling, 202° C. while under a nitrogen atmosphere and permitted to reflux for one hour and then allowed to cool to room temperature. A major portion of the coal remains dissolved in the NMP, as seen in Table 2.

The undissolved residual solids are separated from the resultant coal extract in NMP by filtration in a traditional Buchner filtration apparatus. The filtrate contains the soluble coal fraction while the residue contains the insoluble matter of the coal. The residue is washed with fresh NMP to insure removal of all soluble matter. The filtrate and rinse solvent are combined in a large rotary evaporator where the solvent (NMP) is removed by evaporation under reduced pressure. The solvent is condensed for re-use in extracting quantities of coal. The resultant solid coal extract dried at 150° to a constant weight is analyzed and relevant data appear in Table 2.

The solid coal extract is now to be subjected to thermal treatment appropriate for coking or low temperature carbonization and for laboratory purposes to simulate coking conditions, the solid extract is placed in a coking tube, which is simply a carbon steel tube that after being flushed with nitrogen gas is sealed at both ends to exclude oxygen and prevent any mass from escaping during subsequent heating. The sealed coking tube containing the coal extract is inserted into a ceramic tube furnace and heated in two stages. In the first stage, it is heated to about 400° C., at a rate of about 100° C. per hour and according to accepted coking theory passes through a molten or plastic stage, as the volatile content escapes. This temperature is maintained for about 12 hours and gas is evolved as the coal molecules presumably undergo some depolymerization and dealkylation. Then, the coking tube is heated in a second stage to about 600° C. for about one hour, including heat-up time, and the coal becomes further degasified as volatiles continue to evolve.

After cooling, the carbonized coal extract is removed from the coking tube and is "green coke". It is a more or less friable black mass filled with pores or bubble cavities caused by the escape of the volatile from the coal extract and has a composition specified in Table 2.

The green coke is now ready for thermal processing to achieve so-called calcination. For this processing, the green coke is place in a quartz tube and heated to about 1200° C. and held at this temperature until there is no longer any evidence of volatiles evolving off from the green coke which is about one-half hour in this instance. During calcination, the molecules of the green coke apparently undergo some degree of polymerization while additional volatile matter escapes, resulting in some weight loss in the calcined extract, as can be noted from Table 2, but not as much as would be expected to occur when petroleum coke is subjected to the same calcination treatment.

The product is calcined coke, having the appearance of volcanic lava, and is now no longer friable but a hard porous mass with a grayish color and a chemical composition set forth in Table 2. A sample is checked for isotropicity and found to be properly isotropic and is thus a precursor for isotropic graphite.

For conversion into isotropic graphite, the calcined coke is ground into a coke flour of −200 mesh and mixed with binder pitch, which is a commercial product produced by Aristech Corp., in a ratio of two-thirds calcined coke to one-third binder pitch. The mixture is blended thoroughly in a heated mixer, at about 150° C. at which the binder pitch is molten and fluid, until homogenous, which takes about two hours. The blend is extruded into a cylindrical test shape ¾ in. in diameter and 4 in. in length. This cylinder is baked (carbonized) in an oven at 1200° C. for 8 hours to degas volatile matter from the pitch and carbonize (coke) its residue, giving a hard coherent bar.

Because graphitizing requires expensive special equipment and is difficult to carry out effectively in a laboratory, the carbonized bar was sent to a commercial company, namely, UCAR Carbon Company of Parma, Ohio, to be subjected to graphitization. Such companies are reluctant for competitive reasons to disclose publicly the details of their treatment but it is believed that the bar was heated to a temperature of about 2800° C. for several days. In all probability, this temperature was maintained for a shorter period, say a few hours or less, and the bulk of the time was devoted to cooling. The specific conditions of graphitization are not critical and can be varied within the ranges recognized in this specialized field. After cooling, the graphite structure can be examined for pertinent properties, such as CTE, density, electrical conductivity, Young's modulus and the like. The CTE-transverse for the above sample made from Bakerstown coal was $5.10\times10^{-6}/°C$. while the CTE-axial was $4.30\times10^{-6}/°C$., which compares most favorably with the values reported for other nuclear grade graphite given in Table 1 above. The electrical resistivity was 13.16 micro-ohm-m while the so-called "real" density was 2.19, the real density being obtained by adjusting the measured bulk density of 1.506 g/cc to exclude the pore volume present, the test product in question having been processed without impregnation.

medium consisting essentially of a solvent of the general formula $R_{(n)}$—M(=O) (—$R^1$)—N—$R^2R^3$, where M is a carbon, sulfur, or phosphorous atom, $R^2$ and $R^3$ are each a hydrogen atom or a lower alkyl group, R and $R^1$ are each a lower alkyl group, another —N—$R^2R^3$ group, or together $R^1$ and $R^2$ represent the atoms necessary to close a 5-membered heterocyclic ring, or $R^1$ can be a $R_n$—M(=O) (—$R^x$)—N—$R^2$—group where R, n, $R^2$ are as before and $R^x$ is a lower alkyl group, another —$NR^2R^3$ group or together with $R^2$ can represent the atoms to close a heterocyclic ring, and n is unity where M is phosphorous and otherwise zero, to dissolve in said medium a substantial fraction of said organic matter of the coal equal to from about 25% to about 80% by wt of said coal, separating said extraction medium containing the dissolved fraction of organic matter therein from undissolved material comprising said inorganic matter, recovering said dissolved fraction from the medium as a solid, and subjecting the solid recovered fraction to a coking heat treatment to yield an isotropic calcined coke which is adapted to undergo graphitization to yield a substantially isotropic graphite.

2. The method of claim 1 wherein the coking heat treatment includes a) a first low temperature carbonization phase wherein said solid recovered fraction is heated to about 400°–600° C. to volatilize partially volatile matter therein and yield green coke and b) a second calcination stage wherein the green coke is heated to about 900°–1300° C. to substantially complete the volatilization of such volatile matter and yield calcined coke.

3. The method of claim 1 including the step of grinding the calcined coke into powder, mixing such powder with a

TABLE 2

Comparative Analysis of Bakerstown Coal Products Against Other Carbon Products

Bakerstown Coal

|  | % Carbon | % Hydrogen | % Nitrogen | % Sulfur | H/C Atomic Ratio | % Ash |
|---|---|---|---|---|---|---|
| Raw Coal | 61.3 | 3.94 | 1.00 | 3.94 | 0.77 | 26.4 |
| Residue | 38.9 | 2.48 | 1.02 | 6.24 | 0.76 | 48.7 |
| Recovered Extract | 84.9 | 5.81 | 2.23 | 1.32 | 0.81 | 0.3 |

|  | % Extract Yield* | % Residue* |
|---|---|---|
| Bakerstown Coal | 74.2 | 25.8 |

*On a dried ash-free basis

Typical Carbon Products

|  | % Carbon | % Hydrogen | % Nitrogen | % Sulfur | H/C Atomic Ratio | % Ash |
|---|---|---|---|---|---|---|
| Coal tar Pitch | 91.9 | 4.70 | 1.40 | 0.30 | 0.61 | 0.2 |
| Green Coke | 96.0 | 3.20 | <1.00 | 0.50 | 0.20 | 0.1–0.3 |
| Calcined Coke | 99.0 | <1.00 | <1.00 | 0.5–4.0 | <0.10 | 0.3–1.5 |
| Graphite | >99.0 | <1.00 | <1.00 | <1.00 | <0.10 | 0.0 |

Weight Loss After Heat Treatment

| Green Coke | 10–20% |
|---|---|
| Calcined Coke | <10% |
| Graphite | 0% |

We claim:

1. A method of producing from bituminous coal an isotropic coke essentially free of inorganic matter and adapted to undergo graphitization to yield isotropic graphite, which comprises the steps of extracting a finely divided bituminous coal comprising organic matter and inorganic matter in an extraction medium with which said coal does not soften or undergo chemical reaction, the extraction binder pitch, heating such mixture to above the melting point of said binder pitch, shaping the heated mixture into a shaped product, heating the resultant shaped product again under calcination conditions to calcine the binder pitch, and cooling the shaped product thus obtained.

4. The method of claim 1 including the step of grinding the calcined coke into powder, forming a mixture consisting essentially of such coke powder and a binder pitch, shaping said heated mixture into a shaped product, and subjecting said shaped calcined product to a graphitizing heat treatment to convert the same into an isotropic graphite structure.

5. The method of claim 4 wherein said graphitizing heat treatment comprises at least two stages of heat treatment during which volatile matter escapes and creates pores in the treated product, and following each such stage other than the last, the resultant intermediate product is impregnated with an impregnating pitch to fill the pores thus created.

6. The method of claim 5 where each such stage of said graphitizing heat treatment under is carried out at a temperature in the range of about 2800°–3500 ° C. and the aggregate time of such stages is sufficient to impart graphitization to the product of the last such stage.

* * * * *